(12) United States Patent
Inokuchi et al.

(10) Patent No.: US 6,172,952 B1
(45) Date of Patent: Jan. 9, 2001

(54) OPTICAL DISK DEVICE WITH ABNORMAL JUMP DETECTION

(75) Inventors: Chikashi Inokuchi; Yukihiro Yamasaki, both of Hirakata; Yuji Hisakado, Osaka; Jun'ichi Minamino, Neyagawa; Shigeru Furumiya, Himeji, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/095,212

(22) Filed: Jun. 10, 1998

(30) Foreign Application Priority Data

Jun. 11, 1997 (JP) .................................................. 9-153362

(51) Int. Cl.$^7$ ...................................................... G11B 5/09

(52) U.S. Cl. .......................................... 369/48; 369/44.32

(58) Field of Search ................................... 369/47, 48, 49, 369/54, 58, 32, 33, 44.13, 44.25, 44.26, 44.28, 44.32, 124.01, 124.02

(56) References Cited

FOREIGN PATENT DOCUMENTS

| 05144016 | 6/1993 | (JP) . |
| 05282671 | 10/1993 | (JP) . |
| 09120636 | 5/1997 | (JP) . |
| 10091967 | 4/1998 | (JP) . |

Primary Examiner—Paul W. Huber
(74) Attorney, Agent, or Firm—Renner, Otto, Boisselle & Sklar LLP

(57) ABSTRACT

An optical disk device of the present invention performs at least one of recording and reproduction of an optical disk in which a wobble signal is included along a data-recording track, by rotating the optical disk and by scanning the track on the optical disk using an optical head. The device includes: an extraction section for extracting the wobble signal of the optical disk from an output of the optical head; a synchronization clock generation section for generating a synchronization clock signal based on the wobble signal extracted by the extraction section; and a recording/reproduction section for performing at least one of recording and reproduction of data to/from the optical disk by the synchronization clock signal generated by the synchronization clock generation section.

12 Claims, 11 Drawing Sheets

DISK FORMAT DIAGRAM

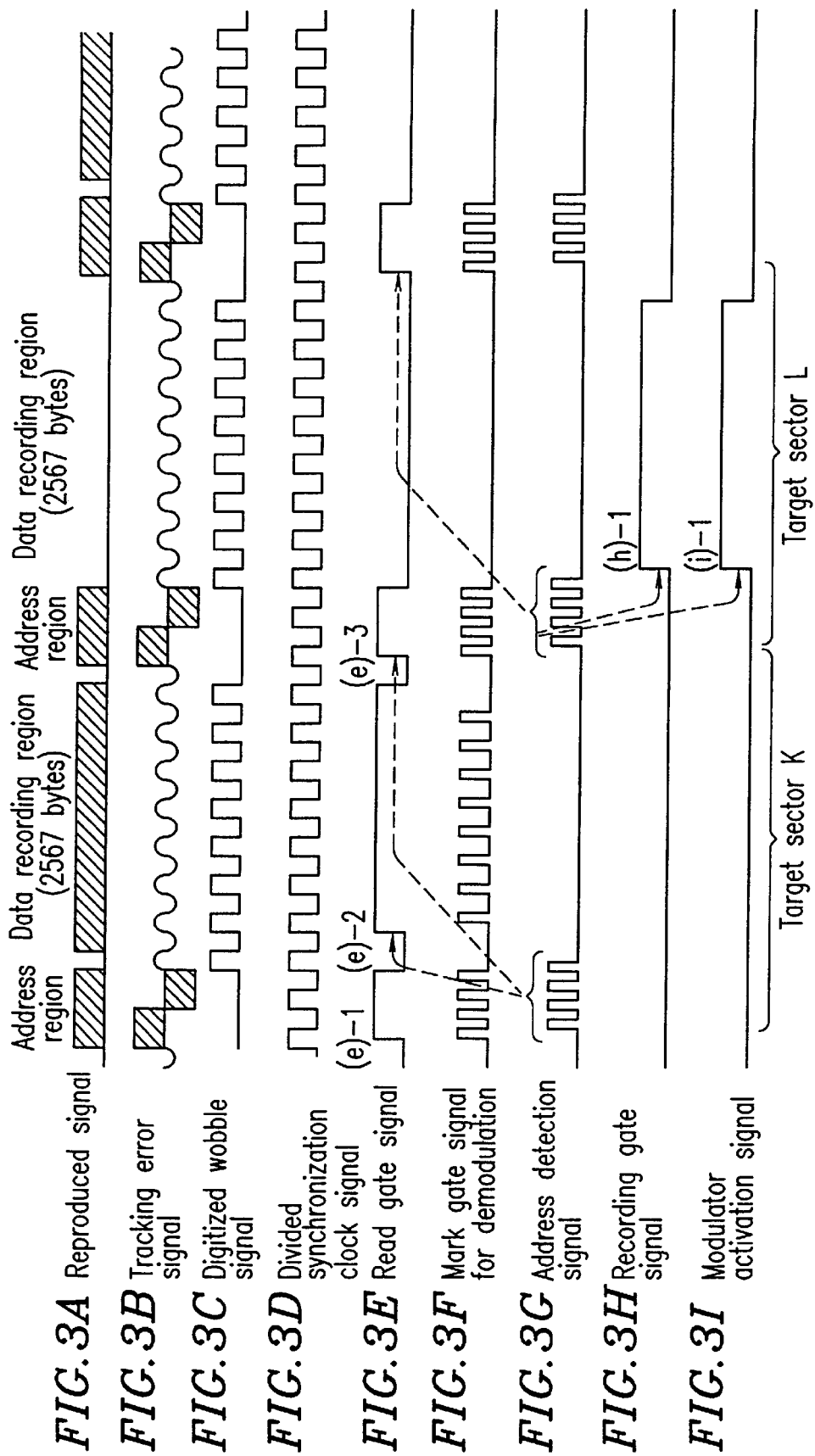

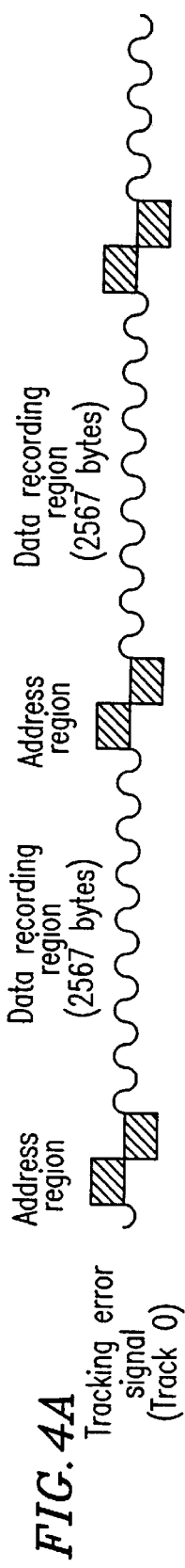
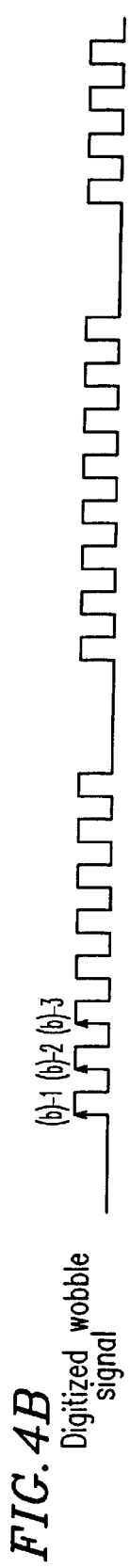
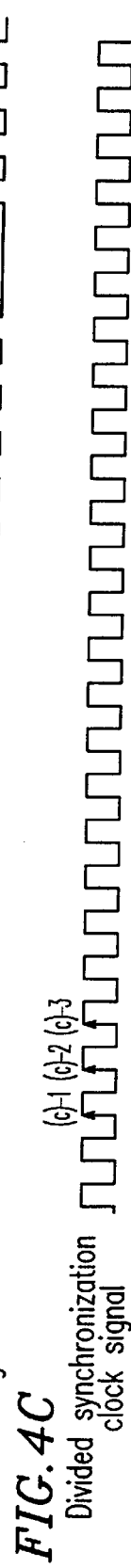
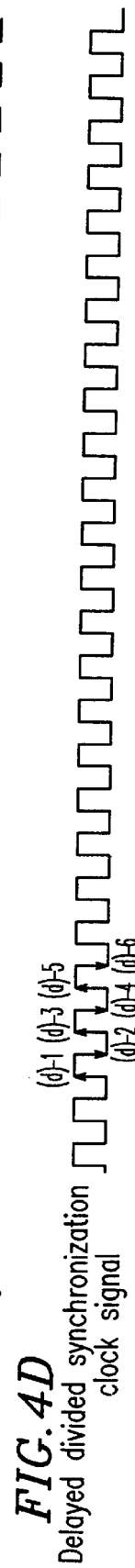
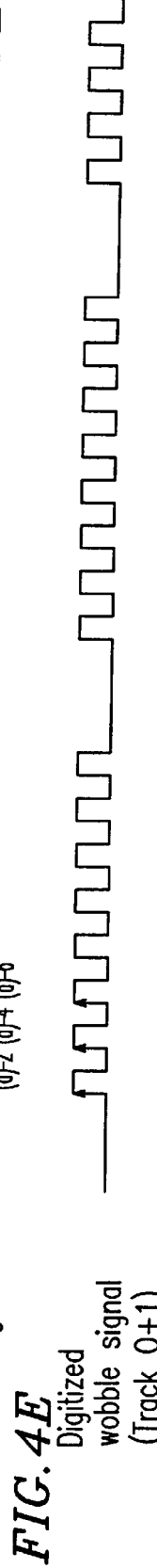
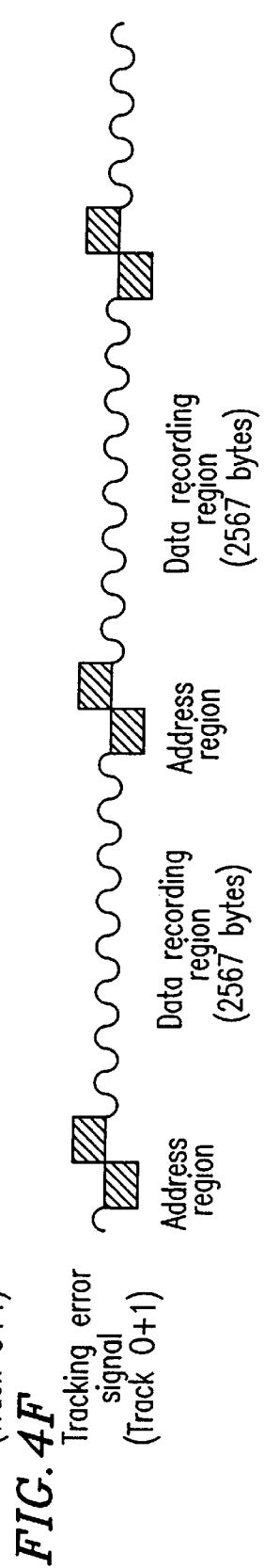
FIG. 4A Tracking error signal (Track 0)
FIG. 4B Digitized wobble signal
FIG. 4C Divided synchronization clock signal
FIG. 4D Delayed divided synchronization clock signal
FIG. 4E Digitized wobble signal (Track 0+1)
FIG. 4F Tracking error signal (Track 0+1)

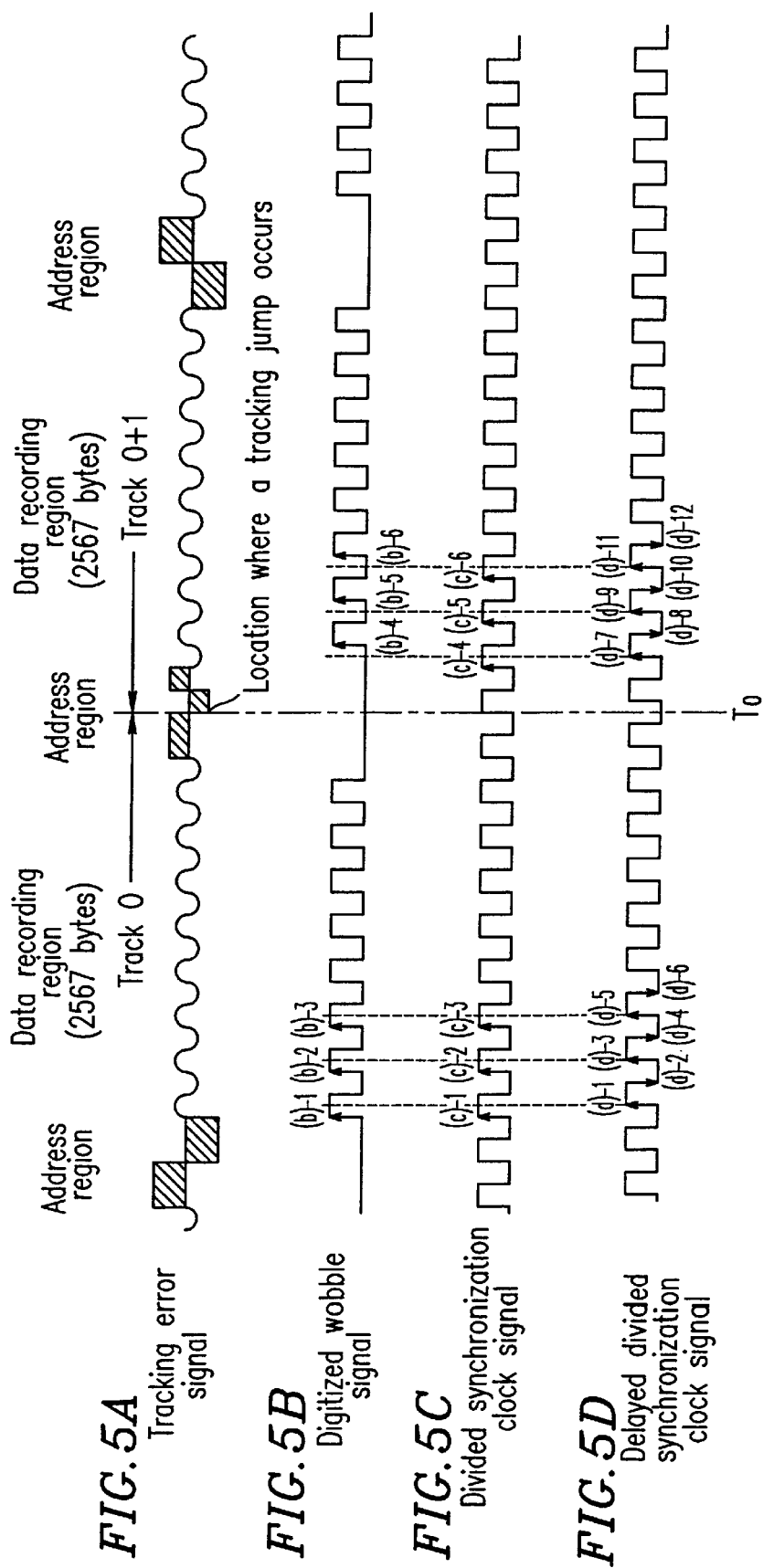

FIG.6 *PRIOR ART*

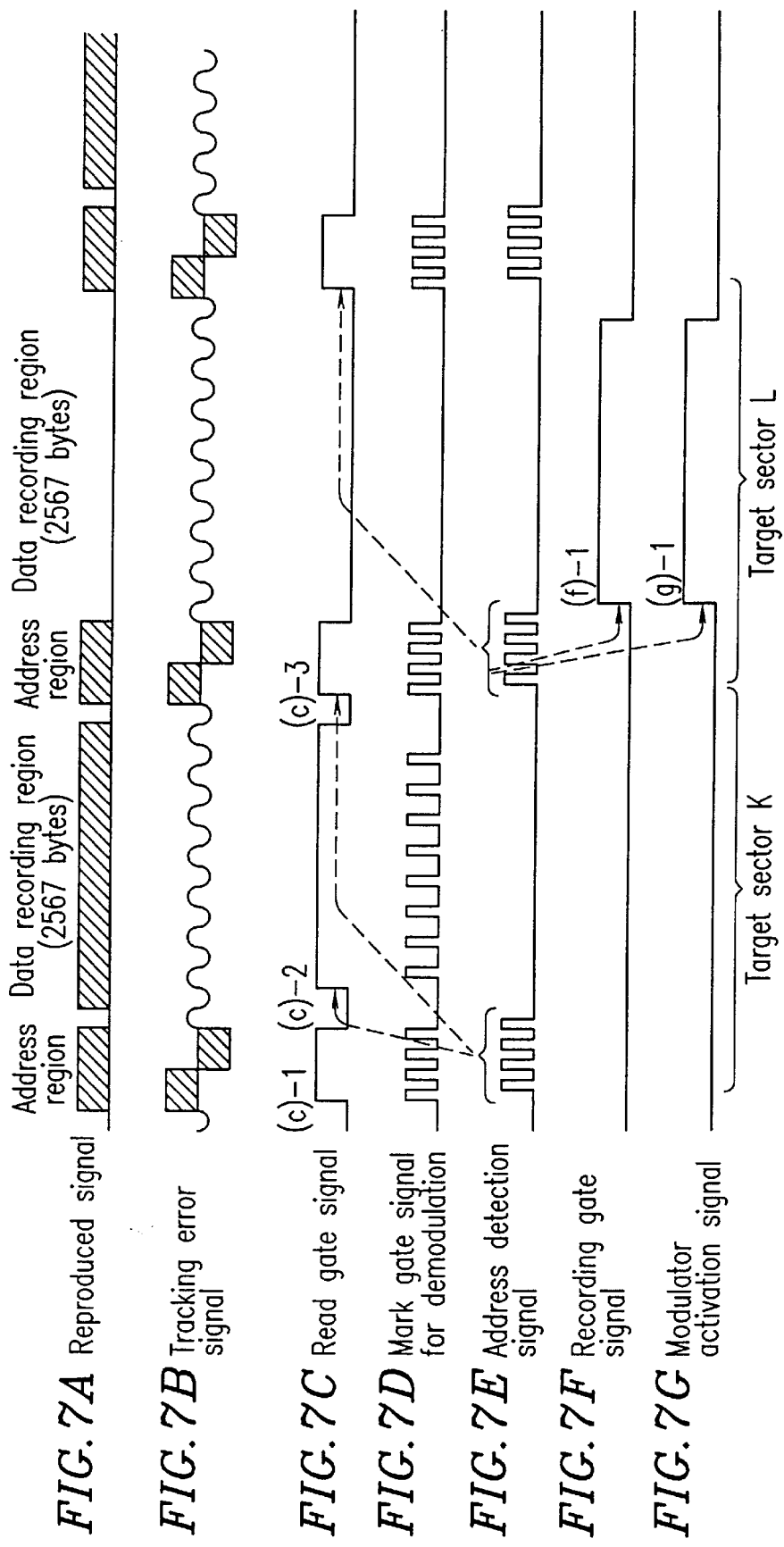

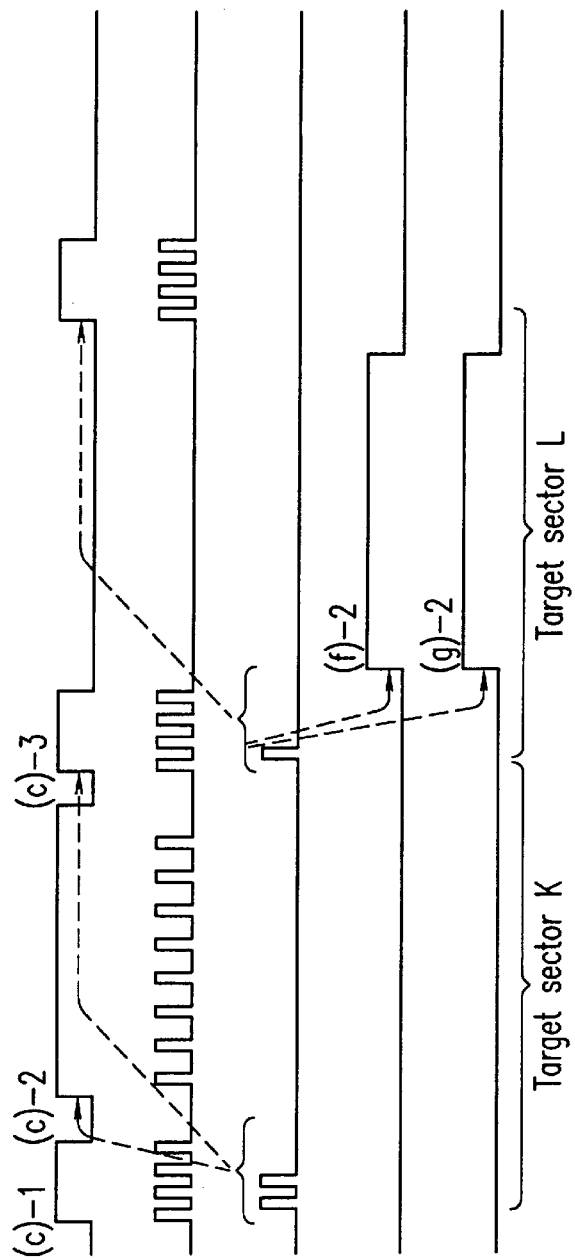

OPTICAL DISK DEVICE WITH ABNORMAL JUMP DETECTION

BACKGROUND OF THE INVENTION

1. Field of the Invention

The present invention relates to an optical disk device for recording/reproducing data to/from an optical disk.

2. Description of the Related Art

As is known in the art, an optical disk which can be recorded/reproduced includes a plurality of tracks. Each track is further divided into a plurality of sectors, and data is recorded/reproduced to/from the disk by sectors. The data recording/reproduction operation is often performed while the disk is rotated at a constant number of rotations, or a constant rotational velocity (CAV: Constant Angular Velocity). For example, wobbling of the tracks on the optical disk is detected so as to produce a wobble signal which has a cycle corresponding to the number of rotations of the optical disk. Based on the wobble signal, a constant number of rotations of the optical disk is reached, after which data is recorded/reproduced to/from the disk in synchronization with a reference clock signal.

Hereinafter, conventional disk recording/reproduction devices will be described.

Figure 6:
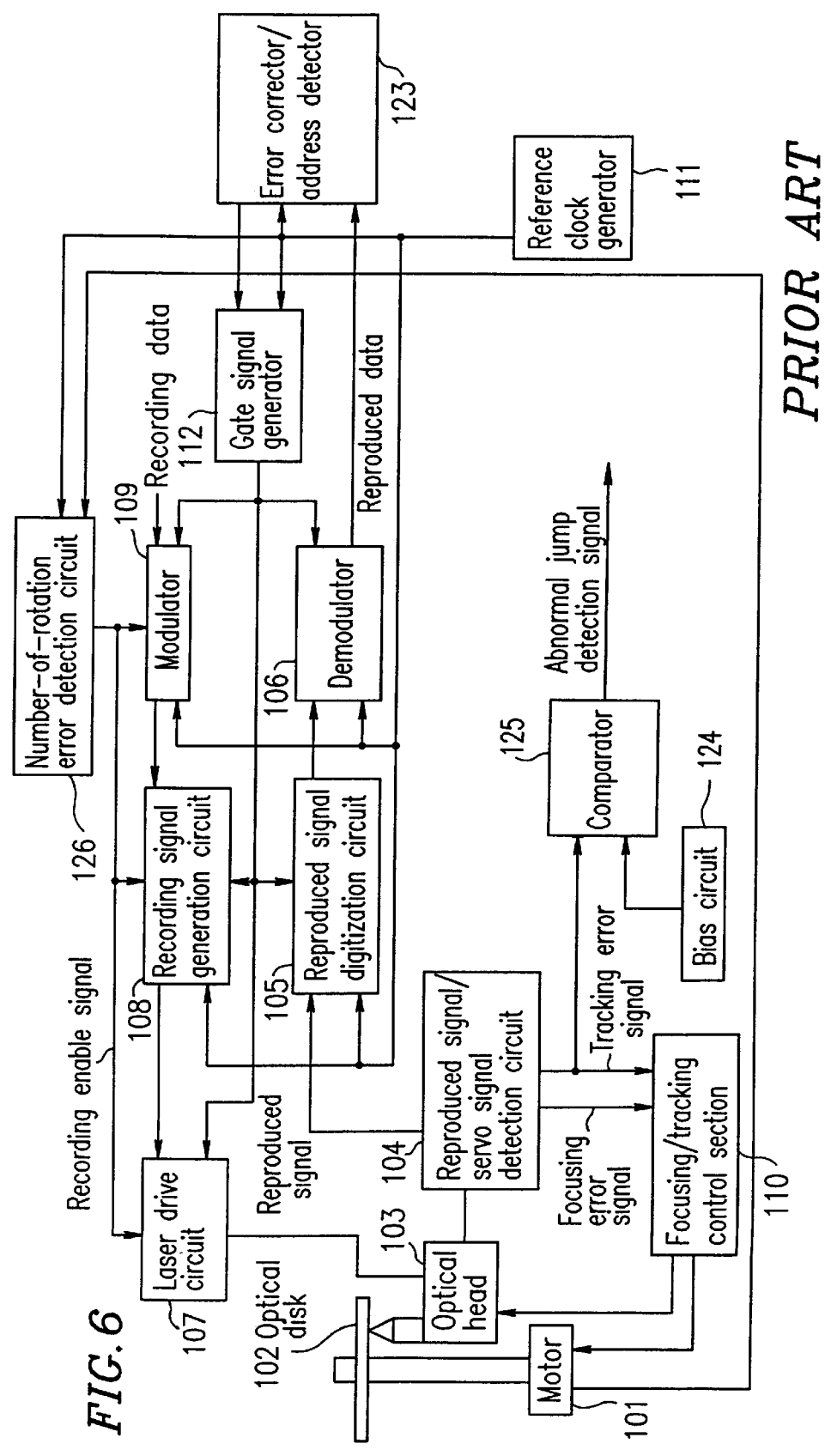

FIG. 6 is a block diagram illustrating a conventional disk recording/reproduction device. Referring to FIG. 6, the disk recording/reproduction device includes: a motor 101; an optical disk 102; an optical head 103; a reproduced signal/servo signal detection circuit 104 for producing a reproduced signal, a focusing error signal and a tracking error signal from an output signal of the optical head 103; a reproduced signal digitization circuit 105 for digitizing the reproduced signal; a demodulator 106 for generating reproduced data by demodulating the digitized reproduced signal; a laser drive circuit 107 for driving a laser as a light source for the optical head 103; a recording signal generation circuit 108 for generating, from the modulated data, a signal for optically modulating laser light by the laser drive circuit 107; a modulator 109 for generating a signal for the recording signal generation circuit 108 by modulating data to be recorded; a focusing/tracking control section 110 for controlling the motor 101 and the optical head 103 using the servo signal from the reproduced signal/servo signal detection circuit 104; a reference clock generator 111 for generating a reference clock signal which is used to generate various gate signals needed for recording/reproducing data; a gate signal generator 112 for generating the various gate signals based on the reference clock signal from the reference clock generator 111; an error corrector/address detector 123 for correcting errors in the reproduced data which has been demodulated by the demodulator 106 and for detecting an address from this data; a bias circuit 124 for generating bias voltages; a comparator 125 for comparing the tracking error signal output from the reproduced signal/servo signal detection circuit 104 with the bias voltages generated by the bias circuit 124 so as to detect an abnormal jump; and a number-of-rotation error detection circuit 126 for detecting the number of rotations of the motor 101 by using the reference clock signal.

In the disk recording/reproduction device having such a structure, data is read out from the optical disk 102 using the optical head 103 while the optical disk 102 is rotated at a predetermined number of rotations. The reproduced signal/servo signal detection circuit 104 receives an output signal of the optical head 103. Based on the output signal, the reproduced signal/servo signal detection circuit 104 generates a reproduced signal, a focusing error signal and a tracking error signal, and provides these signals to the subsequent processing circuits. The focusing/tracking control section 110 is provided with the focusing error signal and the tracking error signal, and controls the optical head 103 to always follow the skew and/or the eccentricity of the disk. The reproduced signal digitization circuit 105 is provided with a reproduced signal, and the demodulator 106 is provided with the digitized reproduced signal and a read clock signal which is synchronized with the reproduced signal.

The reference clock generator 111 generates a reference clock signal needed for modulating/demodulating data to be recorded/reproduced by this device. The demodulator 106 converts the reproduced signal to reproduced data using the digitized reproduced signal and the read clock signal in accordance with a predetermined demodulation rule. The reproduced data is then output to the error corrector/address detector 123 in synchronization with the reference clock signal. The error corrector/address detector 123 detects the addresses of the track on the optical disk 102 from the reproduced data, and outputs address detection signals. Based on the address detection signal, the gate signal generator 112 generates a gate signal in synchronization with the reference clock. The gate signal indicates the timing of address detection, which is periodically performed by the optical head 103. The gate signal is used when detecting an address or when recording/reproducing data.

When recording data is input to the modulator 109, the modulator 109 modulates the recording data in accordance with a modulation rule. Based on the modulated output, the recording signal generation circuit 108 generates and outputs a signal for optically modulating laser light. Based on the signal from the recording signal generation circuit 108, the laser drive circuit 107 drives a laser light source of the optical head 103 so that laser light is irradiated from the laser light source. Thus, the recording data is written immediately after the address region on the optical disk 102.

The comparator 125 compares the tracking error signal generated by the reproduced signal/servo signal detection circuit 104 with predetermined voltages from the bias circuit 124 so as to detect an abnormal jump.

The number-of-rotation error detection circuit 126 compares the number of rotations (or the rotation cycle) of the motor 101 (indicated by the number-of-rotation detection signal from the motor 101) with the frequency (or the cycle) of the reference clock signal from the reference clock generator 111 so as to determine how close the current number of rotations of the motor 101 is to the intended number of rotations. When the error falls within a predetermined range, the number-of-rotation error detection circuit 126 outputs a recording enable signal which allows the device to perform a recording operation. In response to the recording enable signal, the modulator 109, the recording signal generation circuit 108 and the laser drive circuit 107 can start a recording operation.

The operation of the device having such a structure for reproducing/recording data from/to sectors on the optical disk 102 will be described with reference to the timing diagrams of FIGS. 7A to 7G. Each sector on the optical disk 102 includes an address region, where the address of the sector is recorded, and a data recording region for data recording/reproduction.

The reproduced signal/servo signal detection circuit 104 receives an output signal from the optical head 103. Based on the output signal, the reproduced signal/servo signal detection circuit 104 generates a reproduced signal, as illustrated in FIG. 7A, and a tracking error signal, as illustrated in FIG. 7B.

When the number of rotations of the optical disk 102 is matched with the intended number of rotations, in order to read the address of the target sector K, the read gate signal of FIG. 7C is activated at a timing (c)-1 based on the address detection signal which has been output for the sector previous to the target sector K. The read gate signal is used as, for example, a start signal for a synchronization operation of the PLL (Phase Locked Loop) circuit, which is provided in the reproduced signal digitization circuit 105. In response to the read gate signal, the PLL circuit in the reproduced signal digitization circuit 105 starts a synchronization operation for the digitized reproduced signal, and outputs to the demodulator 106 a digitized reproduced signal and a read clock signal which is synchronized with the reproduced signal.

The demodulator 106 demodulates the digitized reproduced signal from the reproduced signal digitization circuit 105 based on the read clock signal therefrom. The address demodulation is stably performed by minimizing the misdetection of an address by ensuring the synchronization of the address using a demodulation mark gate signal output from the gate signal generator 112.

The demodulated data is sent from the demodulator 106 to the error corrector/address detector 123. The error corrector/address detector 123 detects an address by the reference clock signal. When the address is normally detected, the error corrector/address detector 123 generates and outputs an address detection signal, as illustrated in FIG. 7E. Based on the address detection signal, the gate signal generator 112 activates again the read gate signal of FIG. 7C at a timing (c)-2 in order to perform a read out operation for data recorded following the address region. Herein, four pulses are output as the address detection signal because four pre-pits are recorded as the address of the address region. One or more of the four pre-pits which are detected are used as a reference location for the sectors.

A reproduction operation for recorded data begins when the read gate signal is activated, and the synchronization operation of the PLL circuit in the reproduced signal digitization circuit 105 is started in response to the activation. As described above, the PLL circuit in the reproduced signal digitization circuit 105 performs a synchronization operation for the digitized reproduced signal and outputs to the demodulator 106 the digitized reproduced signal and the read clock signal which is synchronized with the reproduced signal. As described above, the demodulator 106 demodulates the digitized reproduced signal from the PLL circuit based on the read clock signal therefrom. The data demodulation is stably performed by minimizing the misdetection of frame marks by ensuring the frame synchronization with the data to be read out from the optical disk 102 using a mark gate signal for demodulation of FIG. 7D from the gate signal generator 112.

The demodulated data is sent from the demodulator 106 to the error corrector/address detector 123. The error corrector/address detector 123 performs error correction for the data by the reference clock signal.

Herein, the reference clock signal and the read clock signal have substantially the same frequency since the number of rotations of the optical disk 102 is matched with the predetermined number of rotations. Therefore, in data transfer between the demodulator 106 and the error corrector/address detector 123, there will occur no problem, for example, due to shortage in the capacity of the buffer memory in the demodulator 106.

Next, a data recording operation to the optical disk 102 will be described.

In the following description, it is assumed that data is to be recorded to a target sector L.

The modulator 109 modulates recording data, which is obtained by adding an error correction code to the data to be recorded.

In order to read the address of the target sector L, the read gate signal of FIG. 7C is activated at a timing (c)-3 based on the address detection signal which has been output for the sector previous to the target sector L to which data is to now be recorded.

In response to the read gate signal, the PLL circuit in the reproduced signal digitization circuit 105 starts the synchronization operation for the digitized reproduced signal, and detects the address in a manner similar to that in the above-described data reproduction operation. Based on the address detection signal obtained when the address of the target sector L is detected, a modulator activation signal, as illustrated in FIG. 7G, is activated at a timing (g)-1, whereby the modulation operation by the modulator 109 and the operation of the recording signal generation circuit 108 begin simultaneously. The recording gate signal of FIG. 7F is activated at a timing (f)-1 based on the address detection signal. In response to this, the laser drive circuit 107 optically modulates the laser light output from the optical head 103 based on the signal from the recording signal generation circuit 108 so as to record data to the sector L.

Next, the reproduction/recording operation where the number of rotations of the optical disk 102 is not matched with the predetermined number of rotations will be described with reference to FIGS. 8A to 8G.

Based on the address detection signal for the sector previous to the target sector K from which data is to now be reproduced, the read gate signal of FIG. 8C is activated at a timing (c)-1 in order to read the address of the target sector K.

In response to the read gate signal, the PLL circuit in the reproduced signal digitization circuit 105 starts the synchronization operation as described above, and outputs to the demodulator 106 a digitized reproduced signal and a read clock signal which is synchronized with the reproduced signal.

Herein, it is assumed that the number of rotations of the optical disk 102 has deviated off the predetermined number of rotations during a period of time, from the timing of the address detection signal for the previous sector to the timing (c)-1 of the read gate signal of FIG. 8C for reading the address of the target sector K. In such a case, the read gate signal of FIG. 8C and the mark gate signal for demodulation of FIG. 8D are not activated accurately at a timing when the address of the target sector K should be read; for example, only the first two of the four pre-pits (addresses) are read. Based on the read address, the error corrector/address detector 123 generates an address detection signal, as illustrated in FIG. 8E. Based on the address detection signal, the gate signal generator 112 activates again the read gate signal of FIG. 8C at a timing (c)-2 in order to perform a read out operation for data recorded following the address region.

Thereafter, the data demodulation should be stably performed by minimizing the misdetection of a frame mark by ensuring the frame synchronization with the data read out from the optical disk 102 by using the mark gate signal for demodulation of FIG. 8D. However, since the number of rotations of the optical disk 102 has deviated off the predetermined number of rotations, the mark gate signal for demodulation of FIG. 8D is not synchronized with the data read out from the optical disk 102, whereby data cannot be normally reproduced.

Similarly in a recording operation, when attempting to perform a recording operation to the target sector L, since the number of rotations of the optical disk 102 is not matched with the predetermined number of rotations, only the first one of the four addresses of the target sector L is read, for example. In such a case, data will be recorded beyond the target sector L, i.e., in the address region of the next sector.

Moreover, when the optical head 103 abnormally jumps from one track to another due to a shock to the device, for example, such an abnormal jump should be detected. In the conventional device, the abnormal jump is detected based on the tracking error signal. However, it is not possible to accurately detect the abnormal jump since the tracking error signal changes in a similar manner both when an abnormal jump occurs and when the address signal is being read.

Next, another conventional disk recording/reproduction device will be described with reference to FIG. 9.

First, the difference of the device illustrated in FIG. 9 from the device illustrated in FIG. 6 will be described. The device illustrated in FIG. 9 includes: an amplifier/filter 114 for amplifying a tracking error signal from the reproduced signal/servo signal detection circuit 104 so as to generate a wobble signal, and for detecting whether the track on the optical disk 102 being currently tracked is a land track or a groove track so as to generate a polarity signal indicating the detection result; a digitization circuit 115 for digitizing the output from the amplifier/filter 114; a phase/frequency comparator 117 for comparing the frequency or the phase of the wobble signal which has been digitized by the digitization circuit 115 with that of the clock signal from a voltage-controlled oscillator (hereinafter, referred to simply as the "VCO") 120 whose frequency has been divided by a frequency divider 129; a charge pump 128 for converting the signal from the phase/frequency comparator 117 indicating the comparison result to an analog value; a low pass filter 119 for integrating the output from the charge pump 128; the VCO 120 for generating a clock signal having a frequency which corresponds to the integrated voltage output from the low pass filter 119; the frequency divider 129 for dividing the frequency of the clock signal from the VCO 120; and a clock frequency divider 127 for dividing the frequency of the reference clock signal from the reference clock generator 111 and the frequency of the clock signal from the VCO 120.

The operation of the device having such a structure for reproducing/recording data from/to the optical disk 102 will be described with reference to the timing diagrams of FIGS. 10A to 10I.

The reproduced signal/servo signal detection circuit 104 receives the output signal from the optical head 103. Based on the output signal, the reproduced signal/servo signal detection circuit 104 generates and outputs a reproduced signal, as illustrated in FIG. 10A, and a tracking error signal, as illustrated in FIG. 10B.

The amplifier/filter 114 removes a high-frequency address signal from the tracking error signal so as to output a wobble signal. The amplifier/filter 114 also outputs a polarity signal indicating whether the track on the optical disk 102 being currently tracked is a land track or a groove track. The digitization circuit 115 digitizes the wobble signal, determines the polarity of the digitized wobble signal based on the polarity signal, and outputs the digitized wobble signal, as illustrated in FIG. 10C. The digitized wobble signal is provided to the phase/frequency comparator 117 in the PLL circuit (including the phase/frequency comparator 117, the charge pump 128, the low pass filter 119, the VCO 120 and the frequency divider 129). A synchronization clock signal which is synchronized with the wobble signal is obtained as an output of the PLL circuit. The frequency of the synchronization clock signal is divided by the clock frequency divider 127, thereby obtaining the frequency-divided synchronization clock signal, as illustrated in FIG. 10D. The frequency-divided synchronization clock signal is provided to the focusing/tracking control section 110, which controls the rotation of the motor. The focusing/tracking control section 110 controls the motor using the frequency-divided reference clock signal and the frequency-divided synchronization clock signal.

The device of FIG. 9 performs a data reproduction/recording operation using the reference clock signal in a manner similar to that of the device of FIG. 6.

When reproducing data, in order to read the address of the target sector K, the read gate signal of FIG. 10E is activated at a timing (e)-1 based on the address detection signal which has been output for the sector previous to the target sector K. The read gate signal is used as, for example, a start signal for a synchronization operation of the PLL circuit, which is provided in the reproduced signal digitization circuit 105. In response to the read gate signal, the PLL circuit in the reproduced signal digitization circuit 105 starts a synchronization operation for the digitized reproduced signal, and outputs to the demodulator 106 a digitized reproduced signal and a read clock signal which is synchronized with the reproduced signal. The demodulator 106 demodulates the digitized reproduced signal from the PLL circuit based on the read clock signal therefrom.

The demodulated address signal is sent to the error corrector/address detector 123. The error corrector/address detector 123 detects the address by the reference clock signal. When the address is normally detected, the error corrector/address detector 123 generates and outputs an address detection signal, as illustrated in FIG. 10G. Based on the address detection signal, the gate signal generator 112 activates gain the read gate signal at a timing (e)-2 of FIG. 10E in order to perform a read out operation for data recorded following the address region.

A reproduction operation for recorded data begins when the read gate signal is activated, and the synchronization operation of the PLL circuit in the reproduced signal digitization circuit 105 is started in response to the activation. As described above, the PLL circuit in the reproduced signal digitization circuit 105 performs a synchronization operation for the digitized reproduced signal and outputs to the demodulator 106 the digitized reproduced signal and the read clock signal which is synchronized with the reproduced signal. The demodulator 106 performs a demodulation operation in a manner similar to that described above. The demodulated reproduced data is sent to the error corrector/address detector 123 in synchronization with the reference clock signal. The error corrector/address detector 123 performs error correction for the reproduced data by the reference clock signal.

Next, the data recording operation of this device will be described.

In the following description, it is assumed that data is to be recorded to the target sector L.

The modulator 109 modulates recording data, which is obtained by adding an error correction code to the data to be recorded.

In order to read the address of the target sector L, the read gate signal of FIG. 10E is activated at a timing (e)-3 based on the address detection signal which has been output for the sector previous to the target sector L to which data is to now be recorded.

In response to the read gate signal, the PLL circuit in the reproduced signal digitization circuit 105 starts the synchronization operation for the digitized reproduced signal, so as to detect an address in a manner similar to that in the above-described data reproduction operation. Based on the address detection signal obtained when the address of the target sector L is detected, a modulator activation signal, as illustrated in FIG. 10, is activated at a timing (i)-1, whereby the modulation operation by the modulator 109 and the operation of the recording signal generation circuit 108 begin simultaneously. The recording gate signal of FIG. 10H is activated at a timing (h)-1 based on the address detection signal. In response to this, the laser drive circuit 107 optically modulates the laser light output from the optical head 103 based on the signal from the recording signal generation circuit 108 so as to record data to the sector L.

However, in the device having such a structure, the synchronization clock signal is used only for controlling the rotation of the motor 101, but is not used as a clock signal for the recording/reproduction operation. Therefore, as in the conventional device of FIG. 6, the data recording/reproduction operation cannot be performed until the number of rotations of the disk reaches the predetermined number of rotations.

As described above, the conventional device for recording/reproducing data to/from an optical disk has the following problems.

(1) The recording/reproducing operation cannot be performed while the number of rotations of the optical disk is not matched with the predetermined number of rotations.

(2) Since an address region is provided to be over a groove track and a land track, the tracking error signal changes in a similar manner both when the address region is being scanned by the optical head and when an abnormal jump of the optical head occurs. Therefore, at least when the address region is being scanned, it is not possible to detect the abnormal jump of the optical head based on the tracking error signal. Moreover, an abnormal jump may possibly misdetected due to variation in a wobble signal.

SUMMARY OF THE INVENTION

According to one aspect of this invention, an optical disk device is provided for performing at least one of recording and reproduction of an optical disk in which a wobble signal is included along a data-recording track, by rotating the optical disk and by scanning the track on the optical disk using an optical head. The device includes: an extraction section for extracting the wobble signal of the optical disk from an output of the optical head; a synchronization clock generation section for generating a synchronization clock signal based on the wobble signal extracted by the extraction section; and a recording/reproduction section for performing at least one of recording and reproduction of data to/from the optical disk by the synchronization clock signal generated by the synchronization clock generation section.

In one embodiment of the invention, the device further includes a section for allowing at least one of recording and reproduction of data to/from the optical disk when a frequency of the synchronization clock signal generated by the synchronization clock generation section falls within a predetermined frequency range.

In one embodiment of the invention, the device further includes: a reference clock generation section for generating a reference clock signal; and a section for comparing a frequency of the synchronization clock signal generated by the synchronization clock generation section with a frequency of the reference clock signal generated by the reference clock signal generation section so as to allow at least one of recording and reproduction of data to/from the optical disk when the comparison satisfies a predetermined condition.

In one embodiment of the invention, the device further includes an abnormal jump detection section for detecting an abnormality where the optical head jumps from one track to another on the optical disk. The detection is performed by comparing the synchronization clock signal generated by the synchronization clock generation section with the wobble signal extracted by the extraction section.

In one embodiment of the invention, at least one of recording and reproduction of the optical disk is discontinued depending upon a detection result of the abnormal jump detection section.

In one embodiment of the invention, the device further includes a tracking error signal generation section for generating, from the output of the optical head, a tracking error signal which indicates a tracking error of the optical head with respect to a track on the optical disk. The extraction section extracts the wobble signal from the tracking error signal.

In one embodiment of the invention, the extraction section includes: a filter for receiving the output of the optical head and transmitting only the wobble signal; and a digitization section for digitizing the wobble signal output from the filter so as to produce a digitized signal.

In one embodiment of the invention, the device further includes an abnormal jump detection section for detecting an abnormality where the optical head jumps from one track to another on the optical disk. The abnormal jump detection section includes: a frequency division section for frequency division of the synchronization clock signal generated by the synchronization clock generation section; a delay section for delaying a phase of an output of the frequency division section by 90° with respect to an output signal of the digitization section; and a polarity detection section for detecting a polarity of the digitized signal output from the digitization section in the extraction section at a timing based on an output signal from the delay section.

In one embodiment of the invention, the synchronization clock generation section includes: a PLL circuit for producing a synchronization clock which is synchronized with the wobble signal; and a hold section for holding a synchronization operation of the PLL circuit. The hold section holds the synchronization operation of the PLL circuit when the wobble signal is not included in the output of the optical head.

In one embodiment of the invention, an address region and a data region are alternately provided along the track on the optical disk.

In one embodiment of the invention, the device further includes a mask section for masking the wobble signal extracted by the extraction section for a certain period immediately after the address region of the optical disk is scanned by the optical head.

In one embodiment of the invention, the synchronization clock generation section includes a PLL circuit for producing a synchronization clock which is synchronized with the wobble signal and a hold section for holding a synchronization operation of the PLL circuit. The hold section holds the synchronization operation of the PLL circuit when the address region of the optical disk is being scanned by the optical head, when the optical head is moving across the tracks on the optical disk, and when the optical head is scanning a region where the wobble signal of the optical disk is not included.

In one embodiment of the invention, the device further includes: an address detection section for detecting an address of the address region of the optical disk from the output of the optical head; and a gate signal generation section for generating, based on the address detected by the address detection section and the synchronization clock signal generated by the synchronization clock generation section, a gate signal needed when the optical head scans the address region of the optical disk and/or when performing a recording/reproduction operation to/from the optical disk.

In one embodiment of the invention, the address detection section detects the address from the output of the optical head in response to the gate signal generated by the gate signal generation section.

Thus, the invention described herein makes possible the advantages of (1) providing an optical disk device capable of performing a recording/reproduction operation while the number of rotations of the optical disk is not yet matched with a predetermined number of rotations; and (2) providing an optical disk device capable of always accurately detecting an abnormal jump of an optical head.

These and other advantages of the present invention will become apparent to those skilled in the art upon reading and understanding the following detailed description with reference to the accompanying figures.

BRIEF DESCRIPTION OF THE DRAWINGS

FIGS. 3A to 3I are timing diagrams for illustrating a recording/reproduction operation performed by the device of FIG. 1.

FIGS. 4A to 4F are timing diagrams for illustrating a synchronization operation performed by the device of FIG. 1.

FIGS. 5A to 5D are timing diagrams for illustrating an operation performed by the device of FIG. 1 when an abnormal jump occurs.

FIG. 6 is a block diagram illustrating a conventional optical disk device.

FIGS. 7A to 7G are timing diagrams for illustrating a recording/reproduction operation performed by the device of FIG. 6.

FIGS. 8A to 8G are timing diagrams for illustrating an operation performed by the device of FIG. 6.

DESCRIPTION OF THE PREFERRED EMBODIMENTS

Hereinafter, an example of the present invention will be described with reference to FIGS. 1 to 4.

Figure 1:
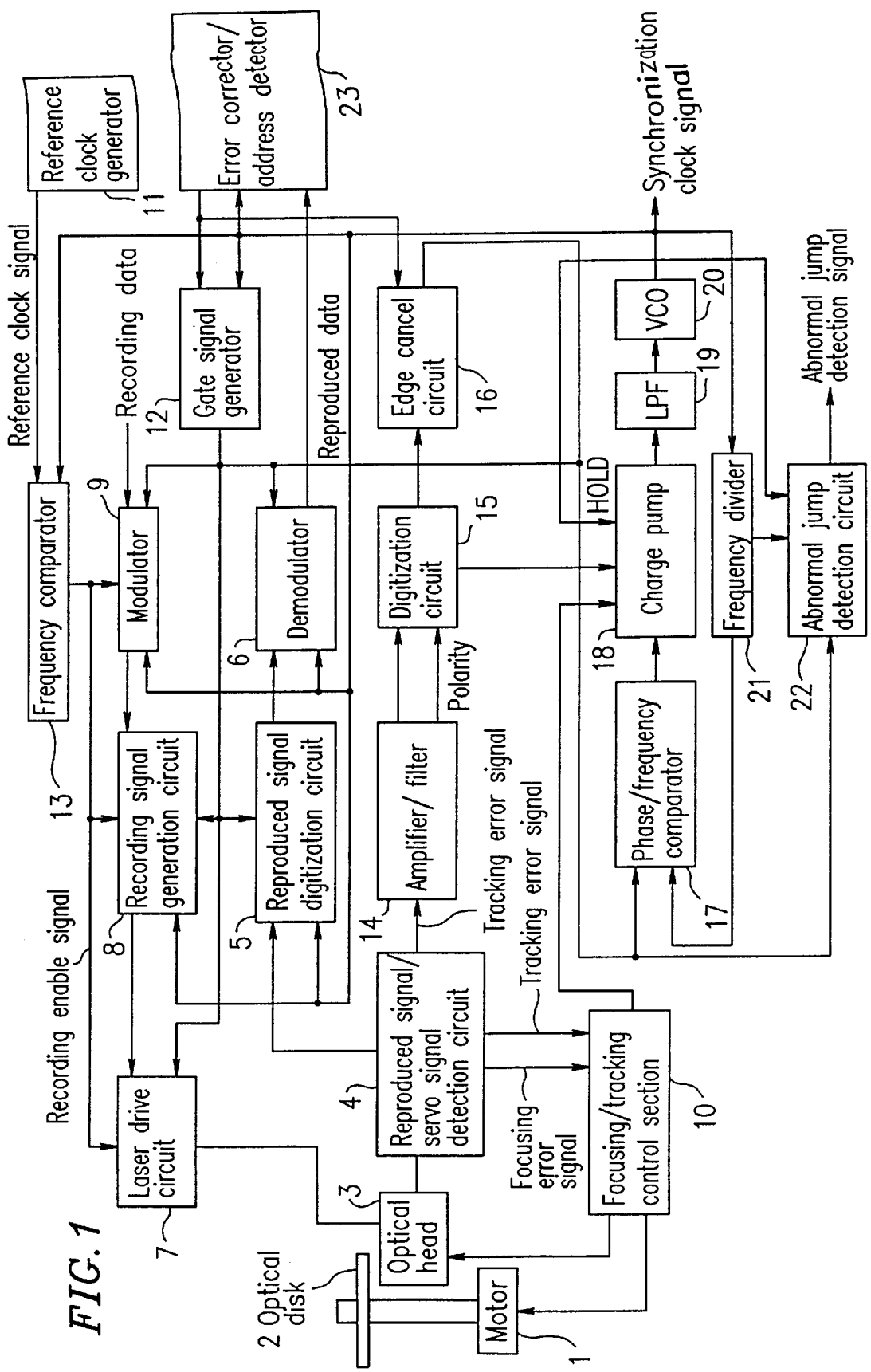
FIG. 1 is a block diagram illustrating an example of an optical disk device of the present invention.

FIG. 1 is a block diagram illustrating an exemplary optical disk device of the present invention.

Referring to FIG. 1, an optical disk 2 is rotated by a motor 1. An optical head 3 is moved by an actuator (not shown) so that a light beam irradiated from the optical head 3 follows a track on the optical disk 2.

The optical head 3 reads out and outputs a signal from the track on the optical disk 2. A reproduced signal/servo signal detection circuit 4 receives an output signal from the optical head 3 and generates a reproduced signal, a focusing error signal and a tracking error signal based on the output signal.

A focusing/tracking control section 10 controls the motor 1 and the actuator of the optical head 3 in response to the focusing error signal and the tracking error signal from the reproduced signal/servo signal detection circuit 4.

A reproduced signal digitization circuit 5 produces a digitized reproduced signal from the reproduced signal received from the reproduced signal/servo signal detection circuit 4 and outputs the obtained signal. A demodulator 6 demodulates the digitized reproduced signal from the reproduced signal digitization circuit 5 so as to produce and output reproduced data. An error corrector/address detector 23 corrects errors in the reproduced data from the demodulator 6 and detects an address from the data.

A frequency comparator 13 compares the frequency of a reference clock signal from a reference clock generator 11 with the frequency of a synchronization clock signal from a VCO 20 so as to output the comparison result. A modulator 9 starts a modulation operation with recording data in response to the comparison result from the frequency comparator 13 so as to provide the modulated output to a recording signal generation circuit 8. Based on the modulated output, the recording signal generation circuit 8 generates and outputs a signal for optically modulating laser light. A laser drive circuit 7 drives a laser light source of the optical head 3 based on the signal from the recording signal generation circuit 8 so that laser light is irradiated from the laser light source.

An amplifier/filter 14 amplifies the tracking error signal from the reproduced signal/servo signal detection circuit 4 so as to generate a wobble signal, and detects whether the track on the optical disk 2 being currently tracked is a land track or a groove track so as to generate a polarity signal indicating the detection result. A digitization circuit 15 digitizes the wobble signal from the amplifier/filter 14, determines the polarity of the digitized wobble signal based on the polarity signal from the amplifier/filter 14, and outputs the digitized wobble signal. In response to the address input from the error corrector/address detector 23, an edge cancel circuit 16 masks a number of cycles of the digitized wobble signal from the digitization circuit 15 immediately after the address.

A frequency divider 21 divides the frequency of the synchronization clock signal from the VCO 20 and outputs the frequency-divided signal. A phase/frequency comparator 17 compares the frequency or the phase of the digitized wobble signal from the edge cancel circuit 16 with that of the frequency-divided output of the synchronization clock signal from the frequency divider 21. A charge pump 18 has a hold function and converts the signal from the phase/ frequency comparator 17 indicating the comparison result to an analog value. A low pass filter 19 integrates the analog value signal from the charge pump 18. The VCO 20 produces a synchronization clock signal having a frequency in accordance with the integrated output from the low pass filter 19 and outputs the synchronization clock signal.

The phase/frequency comparator 17, the charge pump 18, the low pass filter 19, the VCO 20 and the frequency divider 21 form a PLL circuit.

An abnormal jump detection circuit 22 compares the phase of the clock signal whose frequency has been divided by the frequency divider 21 and the phase of the digitized wobble signal from the edge cancel circuit 16 so as to detect an event where the optical head 3 abnormally jumps from one track to another on the optical disk 2.

A gate signal generator 12 generates a gate signal using the synchronization clock signal from the VCO 20 and provides the gate signal to various circuit blocks.

Figure 2A:
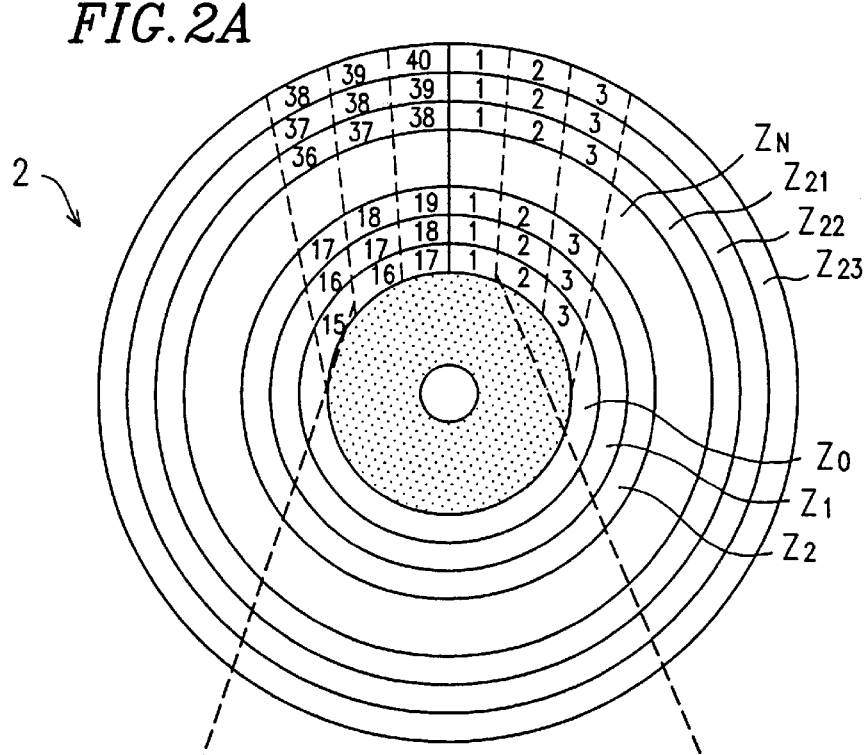
FIG. 2A is a plan view illustrating an optical disk for which the device of FIG. 1 performs recording/reproduction operations.
Figure 2B:
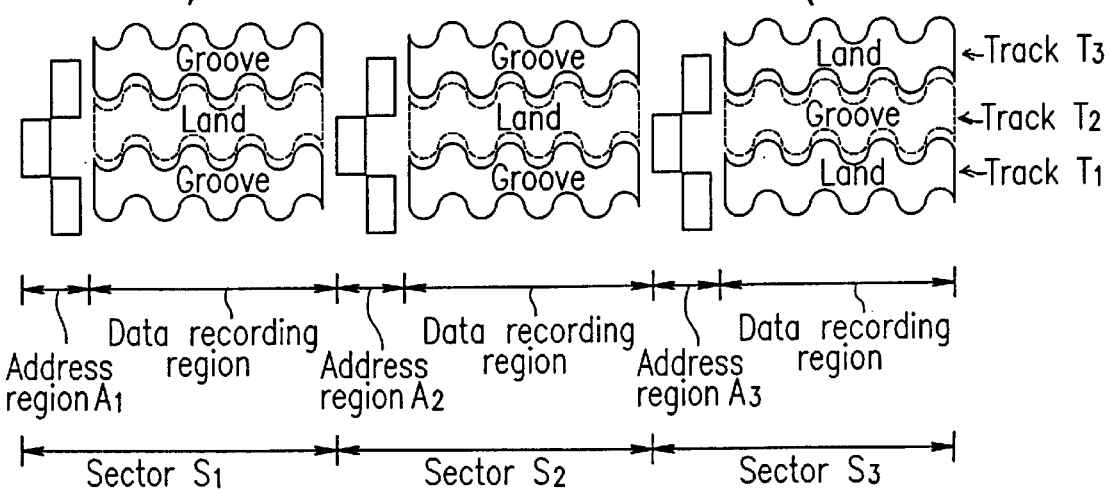
FIG. 2B is an enlarged view schematically illustrating tracks on the optical disk of FIG. 2A.
Figure 9:
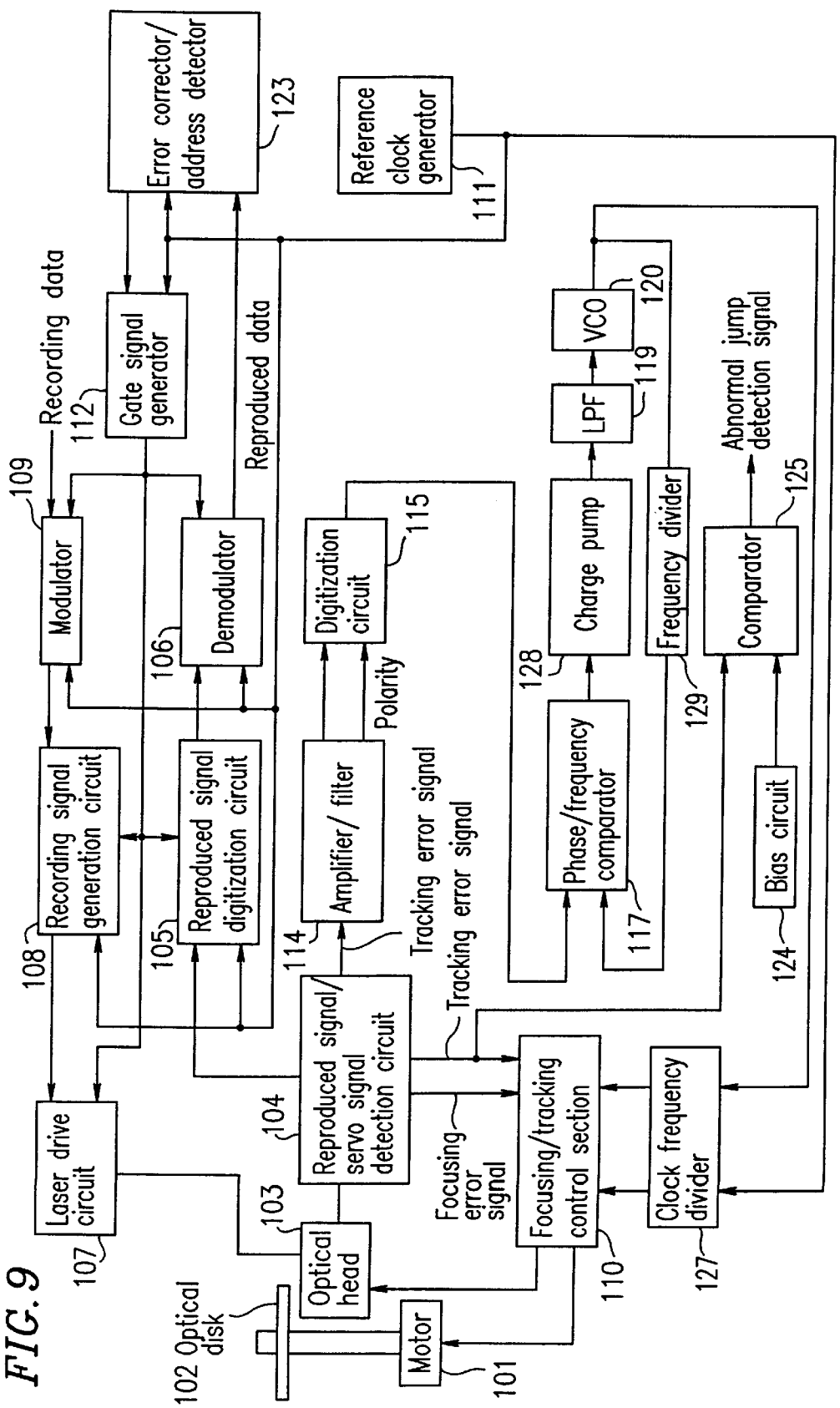
FIG. 9 is a block diagram illustrating another conventional optical disk device.
Figure 10:
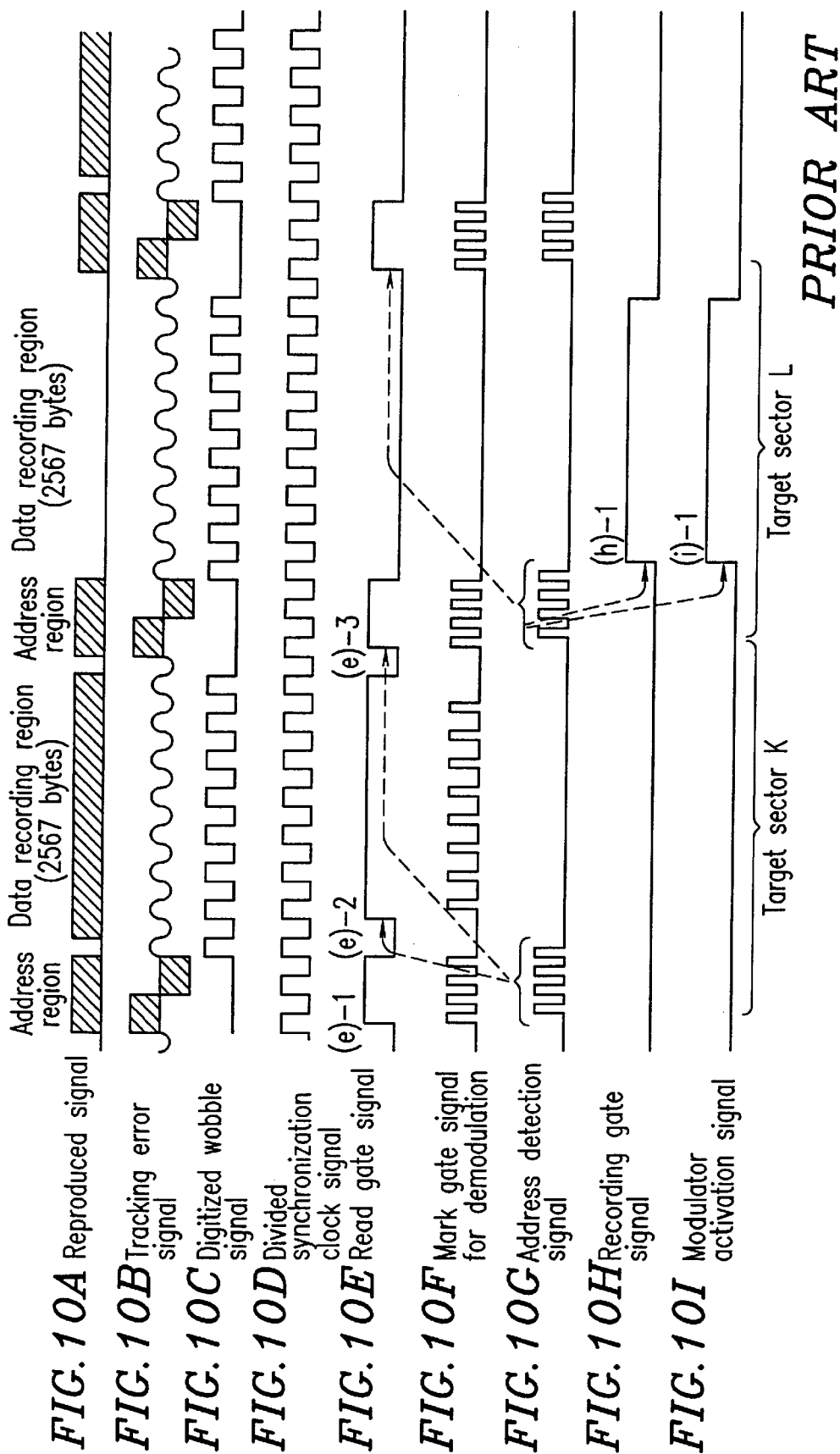
FIGS. 10A to 10I are timing diagrams for illustrating an operation performed by the device of FIG. 9.

For example, an optical disk has a DVD-RAM format, as illustrated in FIGS. 2A and 2B.

FIG. 2A is a plan view illustrating the entire optical disk 2, and FIG. 2B is an enlarged view schematically illustrating tracks on the optical disk 2.

Referring to FIG. 2A, the recording surface of the optical disk 2 is divided into a plurality of zones Z0, Z1, . . . , Zn in a concentric arrangement. Each of the zones is divided into a plurality of sectors. The number of sectors in the zone increases one by one from the innermost zone to the outermost zone. In such a zone format, an outer zone has a larger number of pits per track, so that recording/reproduction of 1 bit of data would require substantially the same length (hereinafter, referred to as the "pit length") in any one of the zones whose circumferential lengths differ from one anther. Thus, the recording capacity of each zone is increased. Accordingly, the number of rotations is made greater in an inner zone, so that the length (duration) of a bit signal is substantially the same among different zone.

Moreover, the zones are controlled at respective constant rotational velocities.

The method of recording/reproducing data to/from the tracks in a zone while rotating the optical disk 2 at a rotational velocity corresponding to the zone being scanned, as described above, is referred to as the zone CLV (Zone Constant Linear Velocity).

In a seek operation (when moving the optical head 3 to the target track), it is advantageous to know in advance which zone is sought, so as to be able to promptly adjust the number of rotations to the number of rotations intended for that zone.

FIG. 2B illustrates a plurality of tracks T1, T2, . . . , in one zone. Each of the tracks T1, T2, . . . , includes a plurality of sectors S1, S2, . . . . Two adjacent tracks are respectively a land track and a groove track. Thus, land tracks and groove tracks are alternately and continuously arranged in a spiral arrangement.

The land and groove tracks are each wobbled in a sinusoidal pattern perpendicularly to the tracking direction.

Address regions A1, A2, . . . , are provided in the beginning of the respective sectors S1, S2, . . . . Neither a land track nor a groove track exists in the address region. An address is recorded in each of the address region so as to be shifted by ½ the track pitch from the corresponding track either toward the inner periphery or toward the outer periphery of the disk.

In each of the sectors S1, S2, . . . , data is recorded following the address on either the land track or on the groove track.

Referring to FIGS. 3A to 3I, the operation of the optical disk device having such a structure for reproducing signals from the optical disk 2 will be described in more detail.

The reproduced signal/servo signal detection circuit 4 receives an output signal from the optical head 3 and generates a reproduced signal, as illustrated in FIG. 3A, and a tracking error signal, as illustrated in FIG. 3B, based on the output signal.

The amplifier/filter 14 amplifies the tracking error signal from the reproduced signal/servo signal detection circuit 4 so as to generate a wobble signal, and detects whether the track on the optical disk 2 being currently tracked is a land track or a groove track so as to generate a polarity signal indicating the detection result. The digitization circuit 15 digitizes the wobble signal, determines the polarity of the digitized wobble signal based on the polarity signal from the amplifier/filter 14, and outputs the digitized wobble signal, as illustrated in FIG. 3C.

The digitized wobble signal is input to the PLL including the phase/frequency comparator 17, the charge pump 18, the low pass filter 19, the VCO 20 and the frequency divider 21. In the PLL, the VCO 20 is controlled so that the phase of the frequency-divided signal obtained by dividing, by the frequency divider 21, the frequency of the clock signal output by the VCO 20 is matched with the phase of the digitized wobble signal, thereby generating a synchronization clock signal which is synchronized with the digitized wobble signal and has a frequency that is an integral multiplication of the frequency of the digitized wobble signal.

Thus, the synchronization clock signal is always in synchronization with the wobble signal included in the output signal from the optical head 3. FIG. 3D illustrates a signal obtained by dividing the frequency of the synchronization clock signal by means of the frequency divider 21.

The gate signal generator 12 produces and outputs a read gate signal, as illustrated in FIG. 3E, and a mark gate signal for demodulation, as illustrated in FIG. 3F, based on the synchronization clock signal from the VCO 20.

In order to read the address of the target sector K, the gate signal generator 12 activates the read gate signal at a timing (e)-1 based on the address detection signal which has been output from the error corrector/address detector 23 for the sector previous to the target sector K which is to now be reproduced.

The read gate signal is used as, for example, a start signal for a synchronization operation of the PLL circuit, which is provided in the reproduced signal digitization circuit 5. In response to the read gate signal, the PLL circuit in the reproduced signal digitization circuit 5 starts a synchronization operation for the reproduced signal from the reproduced signal/servo signal detection circuit 4, and outputs to the demodulator 6 a digitized reproduced signal and a read clock signal which is synchronized with the reproduced signal. The demodulator 6 demodulates the digitized reproduced signal from the reproduced signal digitization circuit 5 based on the read clock signal therefrom. The address demodulation is stably performed by minimizing the misdetection of an address by ensuring the synchronization with the reproduced signal using the mark gate signal for demodulation of FIG. 3F from the gate signal generator 12.

The demodulated address is sent from the demodulator 6 to the error corrector/address detector 23. The error corrector/address detector 23 detects an address by the synchronization clock signal from the VCO 20. When the address is normally detected, the error corrector/address detector 23 generates and outputs an address detection signal, as illustrated in FIG. 3G. Based on this address detection signal, the gate signal generator 12 activates again the read gate signal at a timing (e)-2 (FIG. 3E) in order to perform a read out operation for data recorded following the address region.

The reproduction operation for the recorded data begins when the read gate signal is activated, and the synchronization operation of the PLL circuit in the reproduced signal digitization circuit 5 is started in response to the activation. As described above, the PLL circuit in the reproduced signal digitization circuit 5 performs a synchronization operation for the digitized reproduced signal and outputs to the demodulator 6 the digitized reproduced signal and the read clock signal which is synchronized with the reproduced signal. As described above, the demodulator 6 demodulates the digitized reproduced signal from the PLL circuit based on the read clock signal therefrom. The data demodulation is stably performed by minimizing the misdetection of frame marks by ensuring the frame synchronization with the data using the mark gate signal for demodulation of FIG. 3F from the gate signal generator 12.

The demodulated data is sent from the demodulator 6 to the error corrector/address detector 23. The error corrector/address detector 23 performs error correction for the data by the synchronization clock signal from the VCO 20. Herein, if the PLL including the VCO 20 and the PLL circuit in the reproduced signal digitization circuit 5 are respectively in synchronization with the reproduced signal from the optical disk 2, the synchronization clock signal and the read clock signal have one matched frequency, whereby there will occur no problem in data transfer between the demodulator 6 and the error corrector/address detector 23.

Next, a data recording operation to the optical disk 2 will be described.

In the following description, it is assumed that data is to be recorded to a target sector L.

The modulator 9 modulates recording data, which is obtained by adding an error correction code to the data to be recorded.

In order to read the address of the target sector L, the gate signal generator 12 activates the read gate signal at a timing (e)-3 based on the address detection signal which has been output from the error corrector/address detector 23 for the sector previous to the target sector L to which data is to now be recorded.

In response to the read gate signal, the synchronization operation for the reproduced signal by the PLL circuit in the reproduced signal digitization circuit 5 is started, so as to detect an address in a manner similar to that in the data reproduction operation. When the address of the target sector L is normally detected, the error corrector/address detector 23 generates and outputs an address detection signal, as illustrated in FIG. 3G. Based on the address detection signal, the gate signal generator 12 activates a modulator activation signal, as illustrated in FIG. 3I, and a recording gate signal, as illustrated in FIG. 3H, at a timing (i)-1, (h)-1 so as to record data to the sector L following the address region. In response to the modulator activation signal, the modulator 9 starts a modulation operation with the recording data and provides the modulated output to the recording signal generation circuit 8. Based on the modulated output, the recording signal generation circuit 8 generates and outputs a signal for optically modulating laser light. In response to the recording gate signal, the laser drive circuit 7 drives the laser light source of the optical head 3 based on the signal from the recording signal generation circuit 8 so that laser light is irradiated from the laser light source. Thus, the recording data is written immediately after the address region on the optical disk 2.

A series of data recording/reproduction operations is performed as described above. The series of data recording/reproduction operations may also be performed before the predetermined number of rotations of the optical disk 2 is reached, as long as the synchronization clock signal is stably supplied in synchronization with the wobble signal detected from the optical disk 2.

When recording data to the disk, the frequency comparator 13 compares the frequency of the synchronization clock signal generated by the VCO 20 with the frequency of the reference clock generated by the reference clock generator 11. The recording enable signal is activated only when the frequencies of these two clocks have a predetermined relationship. In response to the activation of the recording enable signal, the modulator 9, the recording signal generation circuit 8 and the laser drive circuit 7 operate to record the recording data.

Even when the synchronization clock signal is stably supplied in synchronization with the wobble signal detected from the optical disk 2, if the number of rotations of the optical disk 2 is considerably larger or smaller than the predetermined number of rotations, a recording operation with a normal recording power obtained by the laser from the optical head 3 will result in an undesirable laser writing operation, thereby detracting from the reliability of the data recorded on the optical disk 2.

Figure 11:
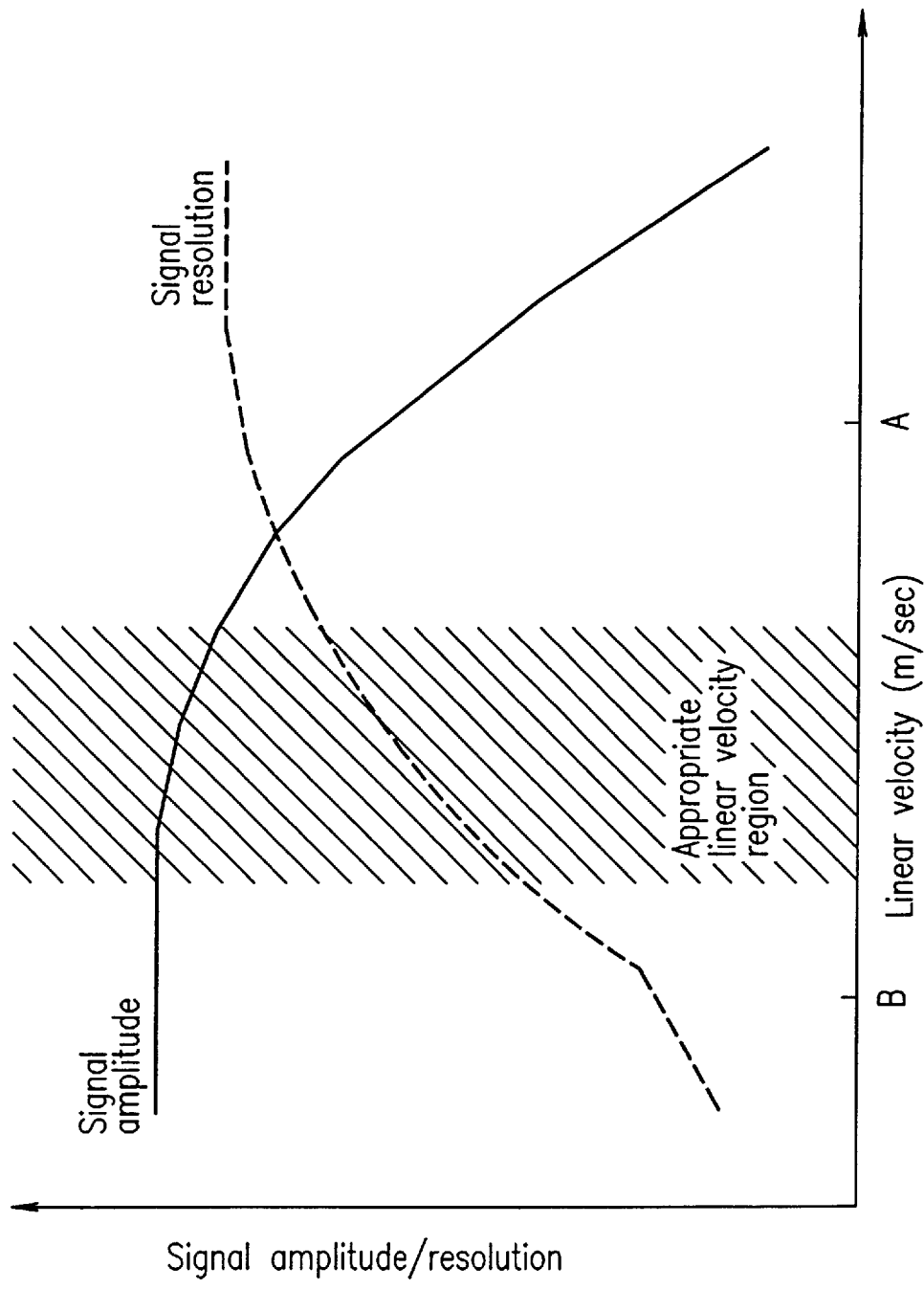
FIG. 11 is a graph illustrating the recording sensitivity characteristic with respect to the linear velocity during the recording operation.

FIG. 11 illustrates the recording sensitivity characteristic (i.e., the signal amplitude and the signal resolution) with respect to the linear velocity during a recording operation.

As illustrated in FIG. 11, assuming the recording power is at a predetermined level, the range of linear velocity appropriate for recording is quite limited. Therefore, in order to ensure the reliability of data recorded on the optical disk 2, the frequency of the synchronization clock signal which is synchronized with the detected wobble signal is compared with the frequency of the reference clock, so that the recording operation for the recording data starts when the frequency of the synchronization clock signal is sufficiently close to the frequency of the reference clock (i.e., when the number of rotations is sufficiently close to the predetermined number of rotations; and, therefore, the linear velocity at which the optical head 3 scans a track on the optical disk 2 is sufficiently close to the predetermined linear velocity), thereby ensuring the reliability of the recorded data on the optical disk 2.

For example, if the recording operation is performed at a linear velocity A in FIG. 11, the linear velocity is relatively too fast with respect to the recording power of the laser, whereby there may occur problems, e.g., the signal amplitude may be reduced, or recording may be difficult or impossible. On the other hand, if the recording operation is performed at a linear velocity B in FIG. 11, the signal amplitude is sufficient, but there may still occur problems, e.g., the signal resolution (i.e., the ratio of high frequency components of a signal to low frequency components of the signal) may be deteriorated, or it may be difficult or impossible to read out the data.

In order to eliminate such problems and enhance the recording reliability, it is very important to control the linear velocity at which a track is scanned. In this example of the present invention, this control is realized by the frequency comparator 13.

The optical disk device according to the present example detects an event where the optical head 3 abnormally jumps from one track to another on the optical disk 2 due to a shock to the device, for example. The detection of an abnormal jump will be described below with reference to FIGS. 4A to 4F.

First, a tracking error signal, as illustrated in FIG. 4A, is produced by the reproduced signal/servo signal detection circuit 4 when scanning a track having a track address 0 (hereinafter, referred to simply as the "track 0") on the optical disk 2. Based on the tracking error signal of FIG. 4A, a digitized wobble signal, as illustrated in FIG. 4B, is produced by the digitization circuit 15.

Another tracking error signal, as illustrated in FIG. 4F, is produced by the reproduced signal/servo signal detection circuit 4 when scanning a track having a track address (0+1) (i.e., the track next to the track 0) on the optical disk 2. Based on the tracking error signal of FIG. 4F, a digitized wobble signal, as illustrated in FIG. 4E, is produced by the digitization circuit 15.

As is apparent from comparison between FIGS. 4A 9 and 4B and FIGS. 4F and 4E, the digitized wobble signals obtained from the two adjacent tracks 0 and (0+1) have polarities inverted with respect to each other (because, if the track 0 is a groove track, for example, then track (0+1) is a land track).

If the signal of FIG. 4C, which is obtained by dividing the frequency of the synchronization clock signal by the frequency divider 21, is synchronized with the digitized wobble signal of FIG. 4B, the edges (b)-1, (b)-2 and (b)-3 match the edges (c)-1, (c)-2 and (c)3, respectively.

The abnormal jump detection circuit 22 delays the phase of the signal of FIG. 4C by 90° so as to produce a delayed divided synchronization clock signal, as illustrated in FIG. 4D. Then, the abnormal jump detection circuit 22 detects an abnormal jump of the optical head 3 by monitoring the phase of the delayed divided synchronization clock signal and the phase of the digitized wobble signal of FIG. 4B from the edge cancel circuit 16.

For example, when the optical head 3 is stably scanning the track 0 on the optical disk 2, the abnormal jump detection circuit 22 detects a high level of the digitized wobble signal of FIG. 4B at each of timings (d)-1, (d)-3 and (d)-5 of FIG. 4D, when the delayed divided synchronization clock signal rises, thereby determining that there is no abnormal jump.

When the optical head 3 abnormally jumps from the track 0 to the track (0+1) on the optical disk 2, the delayed divided synchronization clock signal from the PLL circuit including the VCO 20 will not be immediately synchronized with the digitized wobble signal obtained from the track (0+1). Referring to FIGS. 5A to 5D, when the optical head 3 abnormally jumps from the track 0 to the track (0+1) at a time T0, the digitized wobble signal from the edge cancel circuit 16 will have a phase that is shifted by 180° from its phase before the time T0, as illustrated in FIG. 5B. On the other hand, the signal from the PLL circuit including the VCO 20 cannot immediately follow the phase of the digitized wobble signal of FIG. 5B after the time T0 and remains to have the same phase as that before the time T0, for a certain period of time after T0.

Therefore, after the time T0, the rising edges (b)-4, (b)-5 and (b)-6 of the digitized wobble signal of FIG. 5B will not match the rising edges (c)-4, (c)-5 and (c)-6 of the divided synchronization clock signal of FIG. 5C. After the time T0, the digitized wobble signal will always have a low level at each of the rising edges (d)-7, (d)-9 and (d)-11 of the delayed divided synchronization clock signal of FIG. 5D.

The abnormal jump detection circuit 22 detects a low level of the digitized wobble signal of FIG. 5B at each of the rising edges (d)-7, (d)-9 and (d)-11 of the delayed signal of FIG. 5D, and determines that an abnormal jump occurred, thereby outputting an abnormal jump detection signal.

The abnormal jump detection signal may be provided to the demodulator 6 and the reproduced signal digitization circuit 5, or to the modulator 9, the recording signal generation circuit 8 and the laser drive circuit 7, thereby stopping the operation of these sections to immediately stop the reproduction/recording of data.

In the data region immediately following the address region, when data is frequently overwritten therein, the recording medium is more likely to be deteriorated. Therefore, the PLL circuit including the VCO 20 may be disturbed due to a variation occurring in the tracking error signal immediately after the address region, or it may be disturbed by the digitized wobble signal being provided at an irregular timing due to a transitional operation of the digitization circuit 15. Therefore, the edge cancel circuit 16 masks a number of cycles of the digitized wobble signal from the digitization circuit 15 immediately after the address, thereby preventing the PLL circuit from being disturbed while maintaining stable the synchronization clock signal output from the PLL circuit.

The edge cancel circuit 16 may detect the timing immediately after the address region in response to the read gate signal from the gate signal generator 12, instead of to the address from the error corrector/address detector 23.

The charge pump 18 has a function to hold the synchronization operation of the PLL circuit including the VCO 20 and to keep the frequency of the synchronization clock signal, which is the output of the PLL circuit. For example, the charge pump 18 holds the synchronization operation of the PLL circuit including the VCO 20 in the following events: when the optical head 3 is moving across the tracks on the optical disk 2 under the control of the focusing/tracking control section 10, while the charge pump 18 receives a signal indicating such an event from the focusing/tracking control section 10; when the optical head 3 is scanning the address region on the optical disk 2, while the charge pump 18 receives a signal indicating such an event from the gate signal generator 12; and when the charge pump 18 receives a signal from the digitization circuit 15, indicating absence of the wobble signal. Thus, it is possible to improve the stability of the synchronization clock signal by minimizing the disturbance to the PLL circuit including the VCO 20 in such events: during a seek operation; during a scanning operation of the address region; and the absence of the wobble signal.

A zone CLV optical disk has been described in the above example of the present invention. However, the present invention is not limited thereto, but may also be applied to a CLV or CAV optical disk. In short, according to the present invention, a wobble signal is extracted d from an optical disk, and a data recording/reproduction operation is performed in synchronization with the wobble signal.

The present invention as described above provides the following effects.

The synchronization clock signal used is generated from a wobble signal, thereby allowing recorded data to be reproduced before the predetermined number of rotations, or the linear velocity, of the optical disk is reached. Thus, it is possible to reduce the amount of time required by the optical disk device for a data reproduction operation.

The synchronization clock signal used is generated from a wobble signal, thereby allowing a data recording operation to begin before the predetermined number of rotations, or the linear velocity, of the optical disk is reached. Thus, it is possible to reduce the amount of time required by the optical disk device for a data recording operation.

In the recording operation described above, the linear velocity of the track to which data is to be recorded is controlled by monitoring the frequency of the synchronization clock signal. Thus, it is possible to improve the reliability of the recording operation of the optical disk device.

In the DVD-RAM format, it is possible to detect an abnormal jump of the optical head in the address region as well as in the data region by comparing the phase of the digitized wobble signal with the phase of the signal obtained by dividing the frequency of, and delaying, the synchronization clock signal. Thus, it is possible to improve the reliability of the optical disk device.

The digitized wobble signal and divided synchronization clock signal whose phase is shifted by 90° with respect to the digitized wobble signal are used for detecting the abnormal jump of the optical head. Thus, it is possible to improve the reliability.

The operation of the PLL circuit for generating the synchronization clock signal is held in the events such as: during a seek operation; during a scanning operation of the address region; and the absence of the wobble signal. Thus, it is possible to improve the stability in generating the synchronization clock signal.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk device for performing at least one of recording and reproduction of an optical disk in which a wobble signal is included along a data-recording track, by rotating the optical disk and by scanning the track on the optical disk using an optical head, the device comprising:

an extraction section for extracting the wobble signal of the optical disk from an output of the optical head;

a synchronization clock generation section for generating a synchronization clock signal based on the wobble signal extracted by the extraction section;

a recording/reproduction section for performing at least one of recording and reproduction of data to/from the optical disk by the synchronization clock signal generated by the synchronization clock generation section; and an abnormal jump detection section for detecting an abnormality where the optical head jumps from one track to another on the optical disk, wherein the detection is performed by comparing the synchronization clock signal generated by the synchronization clock generation section with the wobble signal extracted by the extraction section.

2. An optical disk device according to claim 1, further comprising a section for allowing at least one of recording and reproduction of data to/from the optical disk when a frequency of the synchronization clock signal generated by the synchronization clock generation section falls within a predetermined frequency range.

3. An optical disk device according to claim 1, further comprising:

a reference clock generation section for generating a reference clock signal; and a section for comparing a frequency of the synchronization clock signal generated by the synchronization clock generation section with a frequency of the reference clock signal generated by the reference clock signal generation section so as to allow at least one of recording and reproduction of data to/from the optical disk when the comparison satisfies a predetermined condition.

4. An optical disk device according to claim 1, wherein at least one of recording and reproduction of the optical disk is discontinued depending upon a detection result of the abnormal jump detection section.

5. An optical disk device according to claim 1, further comprising a tracking error signal generation section for generating, from the output of the optical head, a tracking error signal which indicates a tracking error of the optical head with respect to a track on the optical disk, wherein the extraction section extracts the wobble signal from the tracking error signal.

6. An optical disk device according to claim 1, wherein the extraction section includes:

a filter for receiving the output of the optical head and transmitting only the wobble signal; and a digitization section for digitizing the wobble signal output from the filter so as to produce a digitized signal, and the abnormal jump detection section includes:

a frequency division section for frequency division of the synchronization clock signal generated by the synchronization clock generation section;

a delay section for delaying a phase of an output of the frequency division section by 90° with respect to an output signal of the digitization section; and a polarity detection section for detecting a polarity of the digitized signal output from the digitization section in the extraction section at a timing based on an output signal from the delay section.

7. An optical disk device according to claim 1, the synchronization clock generation section including: a PLL circuit for producing a synchronization clock which is synchronized with the wobble signal; and a hold section for holding a synchronization operation of the PLL circuit, wherein the hold section holds the synchronization operation of the PLL circuit when the wobble signal is not included in the output of the optical head.

8. An optical disk device according to claim 1, wherein an address region and a data region are alternately provided along the track on the optical disk.

9. An optical disk device according to claim 8, further comprising a mask section for masking the wobble signal extracted by the extraction section for a certain period immediately after the address region of the optical disk is scanned by the optical head.

10. An optical disk device according to claim 9, the synchronization clock generation section including a PLL circuit for producing a synchronization clock which is synchronized with the wobble signal and a hold section for holding a synchronization operation of the PLL circuit, wherein the hold section holds the synchronization operation of the PLL circuit when the address region of the optical disk is being scanned by the optical head, when the optical head is moving across the tracks on the optical disk, and when the optical head is scanning a region where the wobble signal of the optical disk is not included.

11. An optical disk device according to claim 8, further comprising:

an address detection section for detecting an address of the address region of the optical disk from the output of the optical head; and a gate signal generation section for generating, based on the address detected by the address detection section and the synchronization clock signal generated by the synchronization clock generation section, a gate signal needed when the optical head scans the address region of the optical disk and/or when performing a recording/reproduction operation to/from the optical disk.

12. An optical disk device according to claim 11, wherein the address detection section detects the address from the output of the optical head in response to the gate signal generated by the gate signal generation section.

* * * * *